US010761875B1

(12) United States Patent
Burgin et al.

(10) Patent No.: US 10,761,875 B1
(45) Date of Patent: Sep. 1, 2020

(54) LARGE SCALE COMPUTE INSTANCE LAUNCHING

(71) Applicant: Amazon Technologies, Inc., Seattle, WA (US)

(72) Inventors: Joshua Marc Burgin, Seattle, WA (US); Joby Sky Lafky, Seattle, WA (US); Jacob Adam Gabrielson, Seattle, WA (US); Deepthi Chelupati, Seattle, WA (US); Abhijeet Pradeep Tirthgirikar, Seattle, WA (US); Joseph Elmar Magerramov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,237

(22) Filed: Dec. 13, 2018

(51) Int. Cl.
*G06F 9/455* (2018.01)
*G06F 9/48* (2006.01)
*G06F 9/50* (2006.01)
*H04L 29/08* (2006.01)
*G06F 9/38* (2018.01)

(52) U.S. Cl.
CPC ............ *G06F 9/45558* (2013.01); *G06F 9/38* (2013.01); *G06F 9/455* (2013.01); *G06F 9/45533* (2013.01); *G06F 9/48* (2013.01); *G06F 9/4843* (2013.01); *G06F 9/4881* (2013.01); *G06F 9/50* (2013.01); *G06F 9/505* (2013.01); *G06F 9/5038* (2013.01); *G06F 9/5077* (2013.01); *H04L 67/306* (2013.01); *G06F 2009/4557* (2013.01); *G06F 2009/45562* (2013.01); *G06F 2009/45575* (2013.01)

(58) Field of Classification Search
CPC .. G06F 9/455; G06F 9/45533; G06F 9/45558; G06F 2009/45562; G06F 2009/4557; G06F 9/48; G06F 9/4843; G06F 9/4881; G06F 9/50; G06F 9/5005; G06F 9/5038
See application file for complete search history.

(56) References Cited

U.S. PATENT DOCUMENTS

| 2013/0179894 | A1* | 7/2013 | Calder | G06F 9/5027 718/104 |
|---|---|---|---|---|
| 2013/0232480 | A1* | 9/2013 | Winterfeldt | G06F 8/60 717/177 |
| 2014/0282520 | A1* | 9/2014 | Sabharwal | G06F 9/455 718/1 |

(Continued)

*Primary Examiner* — Charles M Swift
(74) *Attorney, Agent, or Firm* — Davis Wright Tremaine LLP

(57) ABSTRACT

A method for launching a plurality of computing instances may include obtaining a request to launch a plurality of computing instances. The request may indicate a first number and a target number of compute instances that is larger than the first number. The method may further include verifying that there is sufficient capacity, for example of a compute instance service, to launch at least the first number of compute instances. The request may be fulfilled by at least launching at least the first number of compute instances in a way that bypasses a rate limit that limits a rate at which compute instances can be launched. In some cases, the method may additionally include launching additional compute instances, as they become available, until the target number has been reached.

20 Claims, 9 Drawing Sheets

(56) References Cited

U.S. PATENT DOCUMENTS

| | | | |
|---|---|---|---|
| 2014/0365626 A1* | 12/2014 | Radhakrishnan | H04L 67/1002 709/222 |
| 2015/0074679 A1* | 3/2015 | Fenoglio | G06F 9/505 718/104 |
| 2015/0089497 A1* | 3/2015 | Borzycki | G06F 21/53 718/1 |
| 2015/0113120 A1* | 4/2015 | Jacobson | G06F 9/5088 709/224 |
| 2015/0172205 A1* | 6/2015 | Anderson | H04L 47/70 709/224 |
| 2015/0234670 A1* | 8/2015 | Shimogawa | G06F 9/45533 718/1 |
| 2015/0304234 A1* | 10/2015 | Salle | G06F 7/00 709/226 |
| 2015/0378765 A1* | 12/2015 | Singh | G06F 9/45558 718/1 |
| 2016/0323373 A1* | 11/2016 | Bryant | H04L 47/781 |
| 2017/0116020 A1* | 4/2017 | Miller | H04L 41/0896 |
| 2017/0199564 A1* | 7/2017 | Saxena | G06F 9/45558 |
| 2017/0257432 A1* | 9/2017 | Fu | G06F 9/5072 |
| 2018/0048532 A1* | 2/2018 | Poort | H04L 67/10 |
| 2018/0067783 A1* | 3/2018 | Sen Sarma | G06F 9/5083 |
| 2018/0115626 A1* | 4/2018 | Venkatraman | H04L 65/601 |
| 2018/0181390 A1* | 6/2018 | Lepcha | G06F 9/5061 |
| 2018/0246746 A1* | 8/2018 | Miller | G06F 9/45558 |
| 2018/0278675 A1* | 9/2018 | Thayer | G06F 9/45558 |
| 2019/0102206 A1* | 4/2019 | Fichtenholtz | G06F 9/5027 |
| 2019/0235896 A1* | 8/2019 | Semmandampalayam | G06F 8/60 |
| 2019/0253930 A1* | 8/2019 | Senju | H04W 8/08 |

* cited by examiner

LARGE SCALE COMPUTE INSTANCE LAUNCHING

BACKGROUND

The use of virtual computing, and more specifically virtual compute or compute instance services, in various industries is ever increasing. As workloads become larger, more computing resources are needed to service the workloads in a reasonable amount of time. Some services provide the ability to launch and provision multiple compute instances or virtual machines in one request. However, complexity of coordinating launching multiple compute instances increases as the number launched goes up. Such complexities can include coordinating other resources to support launching the compute instances and safeguarding existing resources so that the service does not become overloaded. As workload size increases, new ways to provide a larger number of virtual machines in a relatively small time period will be needed.

BRIEF DESCRIPTION OF THE DRAWINGS

Various techniques will be described with reference to the drawings, in which.

DETAILED DESCRIPTION

Figure 1:
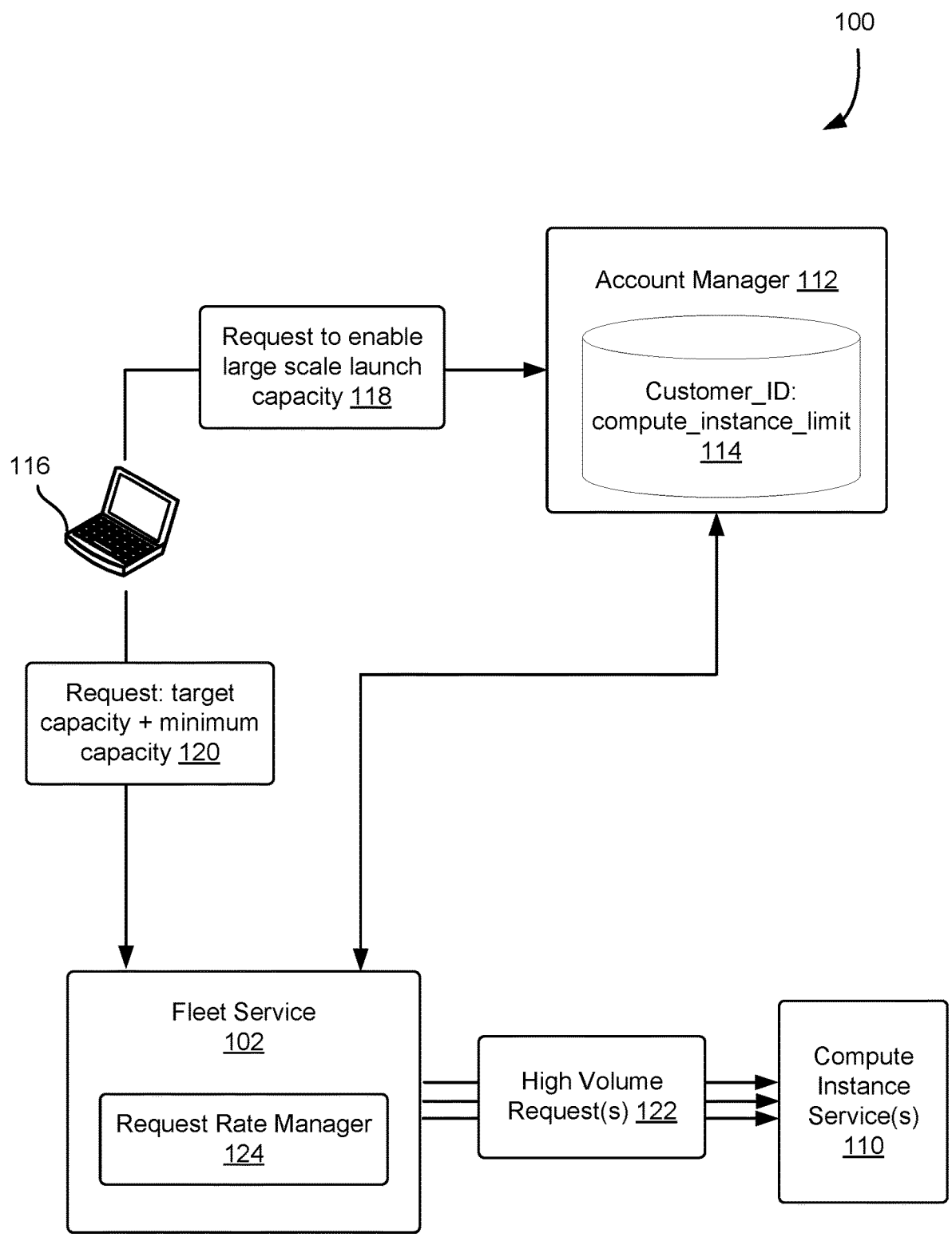
FIG. 1 shows an illustrative example of compute instance provider in which various embodiments may be practiced.

The current document describes systems and techniques for launching a large number of compute instances or virtual machines to improve launch fulfillment time and increase fault tolerance. In one example, a compute instance launching system, or more generally, a compute instance provider, obtains a request to launch a plurality of compute instances or virtual machines. The request may indicate a minimum number of compute instances and a target number of compute instances. Upon receiving the request, the system may verify that a customer submitting the request is authorized for a least the minimum number of compute instances. The system may also determine whether a compute instance service has sufficient capacity to launch the minimum number of computer instances. This determination may be performed synchronously, for example, to ensure that the computer instance service at least has capacity to meet the minimum number of compute instances requested, to reduce later failure of the completion of the request due to overcommitted resources, and to provide the customer information regarding whether the request will be fulfilled quickly to prevent keeping the customer waiting to determine whether the request will be fulfilled. If capacity is available, the system may return an indication that the request has been approved. The indication in response to the request may include a fleet identifier or other identifier. The fleet identifier may enable the account to access the compute instances specified in the fleet, once the fleet has been launched, to enable management operations to be performed on the fleet as a whole instead of requiring the customer to specify operations on an instance-by-instance basis.

In the event of request approval, the system may initiate a workflow to launch at least the minimum number of compute instances by transmitting multiple launch requests in parallel to a compute instance service. In some cases, the launch requests may be sent in batches to facilitate more efficient launching of the compute instances, and reduce the overall time until the compute instances are operational.

In some cases, by utilizing both a minimum number and a target number of compute instances to be launched, the described compute instance launching system may be better situated to fulfill accepted requests. This feature allows customers flexibility to express minimum capacity requirements for a fleet request, and may be particularly useful for fault tolerant workloads. In addition, by verifying that the computer instance service can at least satisfy the minimum number of compute instances at the time the request is received or shortly thereafter, the system may help to ensure that resources are not overcommitted, and requests can be fulfilled more frequently when system capacity allows. The system may verify that enough resources are available without actually reserving the resources, as the verification is synchronously or close to it. This way, resource utilization may be increased without increasing the rate of over committed resources.

In some aspects, the request may be approved upon verifying that the specified minimum number of compute instances is available. The provider may then check to see if there is additional capacity, for example at some point in the future, periodically, aperiodically, or upon a trigger event, such as one or more compute instances or corresponding resources becoming available. Upon determining that there is additional capacity, the provider may launch additional compute instances. In some cases, the provider may launch up to the indicated target number of compute instances, or may launch up to another number, such as the maximum available within a time window or before the job in which the compute instances are used for is completed, a maximum number authorized for the account, etc. In some cases, the provider may continue to check for and launch additional available compute instances for the duration of the request. In the case of multiple large requests, the provider may allocate additional available resources to multiple different accounts, such as base don priority of those accounts, historical data associated with the accounts, in a round robin fashion, etc.

In some aspects, an account administrator for the customer may register with the compute instance provider and request, at any time thereafter, authorization to launch a large number of compute instances in a single request. The compute instance provider may approve or whitelist the account, and authorize the account for a specific limit or standardized limit of compute instances. This may include associating the account with an identifier or authorization code, for example, in an account data store. In other aspects, during the process of registering with the compute instance provider, an account administrator for a customer may request or specify a compute instance quota or limit. In either case, verifying that an account is authorized for a number of compute instances may include accessing authorization information associated with the account an verifying either a limit value or an authorization code, which may take various forms.

In some aspects, determining that the compute instance service has sufficient capacity to launch at least the minimum number of compute instances may include verifying if one or more dependent services can support the launching of the minimum number of compute instances. For example, fulfilling the request may involve allocating (which may include provisioning) storage, such as one or more block-level data storage volumes, for example provided by a block storage service. In this case, the computer instance system may verify that a storage service has capacity to support a minimum number of compute instances, prior to indicating that the request can be fulfilled. In other cases, a separate service may provide compute instances on an availability basis, such as a spare compute capacity utilization service. In these cases, the system may verify that the spare compute capacity utilization service, in addition to or separate from, an on-demand based compute instance service, has capacity to fulfil the requested minimum number of compute instances. In this way, resource utilization of the system may be optimized, while helping to ensure that resources are not over committed.

In some aspects, the process for fulfilling the request may be done so in a way that bypasses one or more rate limits or compute instance limits typically implemented by the compute instance service. In some cases, a compute instance service may impose a limit, such as a throttling limit, to the number of requests or calls it will grant, for example, to ensure that the system does not get overloaded, resources are not overcommitted, and/or to ensure that the behavior of one customer does not affect the ability of other customers to utilize the service . . . . In other cases, accounts may limited via resource limits on how many compute instances they can request or run at once, for example, to minimize overloading the system. In some cases, one or multiple throttling limits and/or resource limits may be bypassed to enable launching of a large number of compute instances, to fulfill requests.

In some aspects, the system may obtain launch request rate information, for example, from a request rate manager. The request rate manager may call a compute instance service or manager thereof, to obtain call rate information including what call rate the service can support. In some aspects, the request rate manager may call the compute instance service manager at various times, such as periodically, aperiodically, etc., to ensure current information is available to adapt to changing conditions. In some aspects, this call may be once per minute. In some aspects, the rate at which launch requests are sent to the compute instance service may be throttled based on the launch request rate information, for example, to ensure that the system is not overloaded.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. The described systems and techniques may enable more compute instances to be launched at once, in a shorter duration of time, with less 500,000 synchronous and asynchronous errors. In some aspects, authorizations for increased compute instance limits may be obtained and managed in advance, thus streamlining the process to launch a fleet of instances. Limit bypasses may be enabled to enable existing compute instance providers or services to support larger numbers of instances being launched in response to a single request, more efficiently. The described techniques may bypass manual authorization, provisioning, and management of large scale fleets, currently necessary in some existing systems.

In some aspects, the described systems and techniques may be particularly beneficial for fault tolerant workloads that need to burst into large scale compute for shorter periods of time to achieve faster results with minimal operational overhead, including large scale simulations and large scale control of various machines, including robotic, autonomous, semi-autonomous machines, and the like. The described systems and techniques may also be particularly beneficial for moving additional workloads to a compute instance provider, if the provider can provision the large scale clusters quickly to meet business SLAs when handling various scenarios, including ad-hoc requests or re-running a simulation for unexpected reasons or upstream failures that caused a delay to a planned simulation pipeline, for example, relating to various industries, including the Financial Services Industry.

FIG. 1 shows an illustrative example of an environment, including a compute instance provider 100, in which various embodiments may be practiced. Compute instance provider 100 may include a fleet service 102, which may facilitate launching of compute instances or virtual machines. The fleet service 102 is a computer system, and in some aspects, a distributed computer system, that includes a set of servers that provide a customer-facing application programming interface (API) that customers and/or other services can call to configure, launch, and manage a number of compute instances and supporting resources, such as data storage, and other resources. The servers of the fleet service 102 can include software and/or hardware to configured computer systems, to perform operations as described herein.

Compute instance provider 100 may also include one or more compute instance service(s) 110, which collectively is a computer system or distributed computer system, that includes a set of servers and data storage devices that configure, launch, and manage compute instances. The servers of the compute instance service(s) 110 can include software and/or hardware to configured computer systems, to perform operations as described herein.

Compute instance provider 100 may also include an account manager 112, which is a computer system that includes one or more servers or other computing devices and data storage devices to create, update, and access account information for clients 116. The servers of the account manager 112 can include software and/or hardware to configure computer systems, to perform operations as described herein.

Fleet service 102 may communicate with an account manager 112 and compute instance service(s) 110, over one or more networks. One or more of fleet service 102, account manager 112, and compute instance service(s) 110 may include or be hosted on web server 906 and/or application server 908, as described below in more detail in reference to FIG. 9. In some examples, data store 114 may be an example of or include one or more aspects of data store 910 described in more detail in reference to FIG. 9

Fleet service 102 may also include a request rate manager 124, which is a separate computer system or hardware and/or software sub-system of the fleet service 102 that manages requests sent to compute instance service(s) 110 to launch compute instances, for example, in response to requests received from one or more clients 116. The compute instance service(s) 110 may launch compute instances upon receiving launch requests from the fleet service 102.

The account manager may 112 may manage a number of accounts and information associated with various accounts, for example, in one or more databases or data stores 114. Each account, for example, associated with the fleet service 102, may be include an identifier and be associated with various information, including, for example, a compute instance limit.

A client, such as client 116, through any number of various computing systems, may register or otherwise request to enable large scale compute instance launching, for example, via request 118 to account manager 112. In some aspects, a large scale compute instance request may include a number that is higher than would be authorized by the provider 100 without having registered an increased limit (e.g., a large number is higher than a default number that is authorized or set by the provider). Upon receiving the request 118, the account manager 112 may validate the account associated with client 116 and authorize a compute instance limit, either by specifying a specific limit, or with a authorization code. The account manager 112 may associate the compute instance limit with the account in the data store 114.

Client 116 may request to launch a number of compute instances with the fleet service 102, for example, via a request 120, which specifies a minimum capacity or number of compute instances, and a target or desired number of compute instances. The fleet service 102, upon receiving the request, may verify, with the account manager 112, that the account is authorized for at least the minimum number of compute instances requested. If the account is authorized, the fleet service 102 may then determine if compute instance service(s) 110 have capacity to fulfill the request, such that it can provide the minimum number of compute instances specified in the request 120. In some case, this may be performed by the request rate manager 124. In any event, if the compute instance service(s) 110 have capacity, the fleet service 102 may communicate an indication that the request can be fulfilled, to the client 116. The fleet service 102 may then instruct the request rate manager 124 to launch at least the minimum number of compute instances, and preferable the target number of compute instances if capacity allows, to the compute instance service(s) 110, via one or more batches of launch requests 122. In some cases, it may be beneficial, given a large number of compute instance requests, for the request rate manager 112 to submit the launch requests in multiple parallel batches, to facilitate faster launching of a large number of compute instances.

In some aspects, upon verifying that the account is authorized for at least the minimum number of requested compute instances, the fleet service 102 and/or request rate manager 124 may bypass one or more throttle limits, for sending launch requests to the compute instance service(s) 110. The throttle limits may normally be enforced or implemented by request rate manager 124 to ensure that the compute instance service(s) 110 are not overloaded by a large number of requests, and/or to ensure efficient operation of the service(s) 110. However, in the case that an account is authorized, these limits may be beneficially bypassed, to facilitate more efficient launching of a large number of compute instances for a pre-authorized account.

In yet some aspects, the fleet service 102 and/or compute instance service(s) 110 may similarly impose one or more resource limits, to help ensure that the system is not unduly overloaded by one or a few actors or accounts. The fleet service 102 and/or compute instance service(s) 110, may beneficially bypass these limits, to facilitate more efficient launching of a large number of compute instances for a pre-authorized account.

Figure 2:
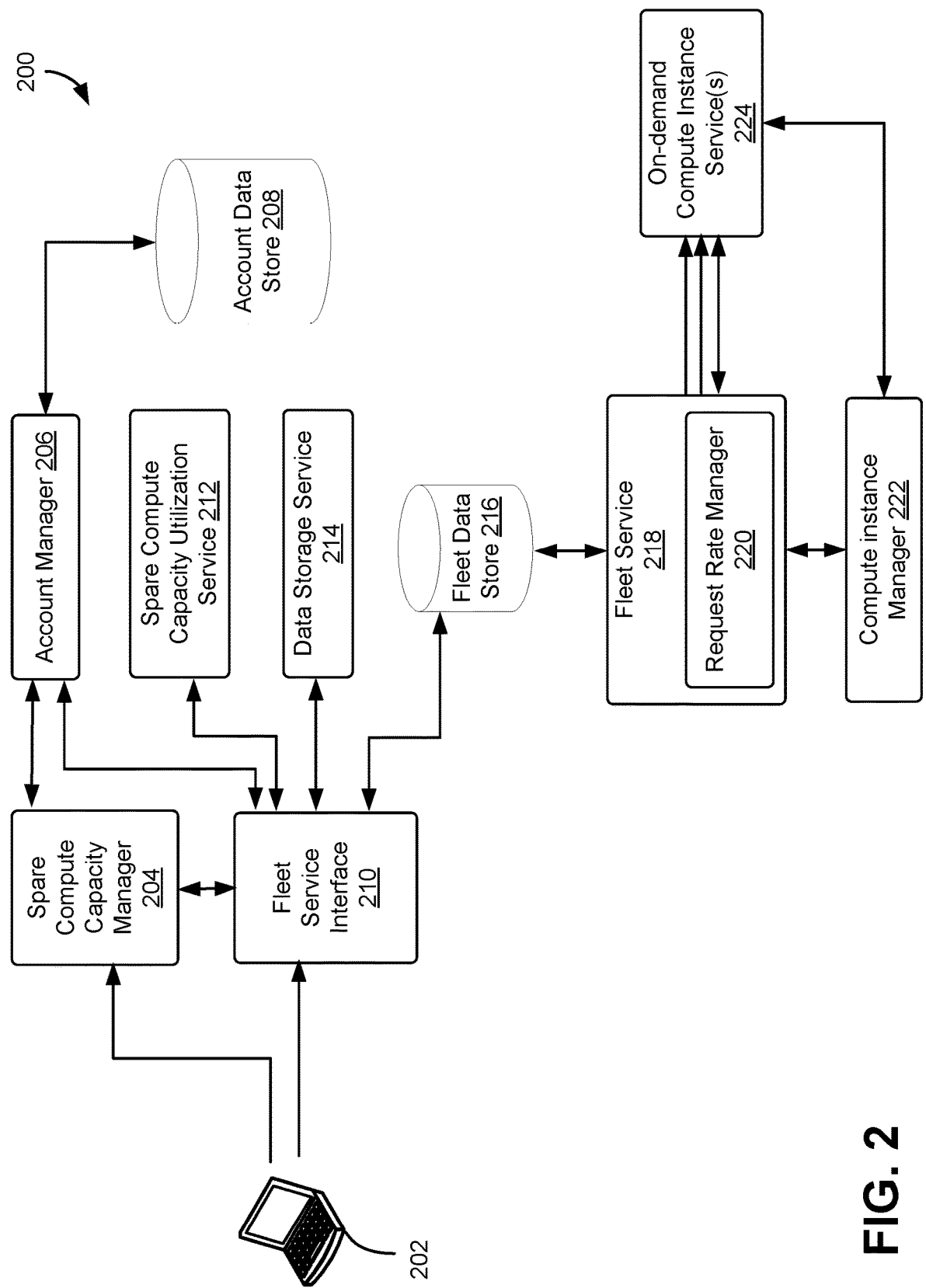
FIG. 2 shows an illustrative example of a compute instance provider for providing a larger number of compute instances in response to a client request.

FIG. 2 shows an illustrative example of a compute instance provider 200 for providing a larger number of compute instances in response to a client request. Compute instance provider 200 may incorporate one or more aspects of compute service provider 100, described above in reference to FIG. 1. Similarly, one or more components or services of provider 200 may include or be hosted on web server 906 and/or application server 908, as described below in more detail in reference to FIG. 9. In some examples, one or more of account data store 208, data storage service 214, and fleet data store 216 may be an example, include one or more aspects of, or be implemented at least in part by data store 910 described in more detail in reference to FIG. 9.

In the illustrated example, compute instance provider 200 may include a fleet service interface 210, which may provide an interface (e.g., one or more web interfaces, user interfaces, or application programming interfaces (APIs)) for accessing various services provided by the compute instance provider 200, such as fleet service 218, account manager 206, a spare compute capacity utilization service 212, a data storage service 214, and a fleet data store 216. In the illustrated example, the fleet service 218 may communicate with on-demand compute instance service(s) 224, which may launch compute instances when requests are received. Spare compute capacity utilization service 212, on the other hand, may launch compute instances when they are available, also in response to received requests, so as to provide more flexible scheduling and resource usage of the underlying resources utilized to provide compute instances to clients 202. In some cases, on-demand compute instance service(s) 224 may include and/or or coordinate with the spare compute capacity utilization service 212. In some aspects, the fleet service 102 may use the capacity of multiple different services 212, 224, and other services, as will be described in greater detail below, to fulfill compute instance requests, such as by using a combination of on-demand and spare compute capacity. In some aspects, fleet service 218 may additionally or alternatively use different services of different providers.

In some aspects fleet service interface 210 may provide a unified API to both spare compute capacity utilization service 212 and fleet service 218/on-demand compute instance service 224, such that they are treated as one service. In this scenario, spare compute capacity manager 204 may similarly be integrated with fleet service interface 210, such that they share a unified API. In some aspects, the spare compute capacity utilization service 212 may interact with fleet service 218 or fleet service interface 210 to fill fleet service's 218 capacity, such as through a variable pricing market implementation.

The fleet service interface 210 may also communicate with a data storage service 214, which may provide data storage and memory resources to support compute instances launched by spare compute capacity utilization service 212 and/or on-demand compute instance service(s) 224. The fleet service interface 210 may also communicate with fleet data store 216, for example, to store fleet request information, for example received from one or more clients 202. It should be appreciated that one or more services or components of provider 200 may communicate with one another directly, even though such communication links are not explicitly illustrated.

In some aspects, provider 200 may include both a spare compute capacity utilization service 212 and on-demand compute service(s) 224, to better optimize usage of compute instances resources. The fleet service interface 210 may coordinate with both the spare compute capacity utilization service 212 and the on-demand compute instance service(s) 224 to fulfil compute instance launch requests from clients 202. It should be appreciated, that in other cases, only one of services 212 and 224 may be included in provider 200, or that only one of services 212 and 224 may be used to fulfill a request, based on available resources, provider optimization, cost considerations, or for other reasons. In some aspects, a spare compute capacity manager 204 may be provided, to manage the spare compute capacity utilization service 212 and/or to interface with account manager 206. In some cases, these functions may be split or combined with the fleet service interface 210.

A client 202 may register with the provider 200 via sending account information to spare compute capacity manager 204. In some aspects, the client 202 may request, either at account initialization, or at a later time, an increased limit on how many compute instances can be launched for a single request or operating for the account at any given point in time, with the spare compute capacity manager 204. The spare compute capacity manager 204 may approve the request, given certain account criteria, such as payment, usage history, etc. or other information, and communicate the account information to the account manager 206, which may store the account informational account data store 208. A more specific example of communications for increasing a compute instance limit will be described in greater detail below in reference to FIG. 3.

The client 202 may submit a request to launch a number of compute instances with the fleet service interface 210. The request may include both a minimum number and a target number of compute instances to be launched, in order to ensure that the request will be granted on the condition that the minimum number of compute instances is available. Upon receiving the request, the fleet service interface 210 may verify, with the account manager 206, that the account associated with the request is authorized to launch at least the minimum number of instances specified in the request. A more specific example of communications for verifying that an account is authorized for a compute instance limit will be described in greater detail below in reference to FIG. 4.

Upon receiving the request, the fleet service interface 210 may also determine if the provider 200 has enough capacity to fulfill at least the minimum number of compute instances in the request. In some cases, this may include verifying capacity with the fleet service 218, and hence the compute instance manager 222. The compute instance manager 222 may verify capacity with the on demand compute instance service(s) 224 and/, in some cases, the spare compute capacity utilization service 212. In other cases, the spare compute capacity manager 204 may verify that the spare compute capacity utilization service 212 has sufficient capacity. In some aspects, the fleet service interface 210 may verify available capacity directly with the spare compute capacity utilization service 212. In some aspects, the fleet service interface 210 may also verify or determine capacity available with one or more data storage services 214, which may include various numbers and types of storage volumes in a block level storage system to support compute instances. In cases where provisioning of compute instances requires or is enhanced by other dependent services, the fleet service interface 210 may verify capacity of those other dependent services. An example of communications for determining or verifying capacity of one or more services of provider 200 will be described in greater detail below in reference to FIG. 5.

In some aspects, the fleet service interface 210 may send the request to the fleet data store 216, to enable the fleet service 218 to access the request. In some aspects, a request rate manager 220 may communicate with one or more compute instance managers 222, which may be organized by geographic region or subnet to determine the availability of compute instance resources, in response to a request accessed via fleet data store 216. Upon receiving the availability or capacity information, the fleet service 218 may communicate the information to the fleet service interface 210, whereby an indication of the status of the request may be communicated to the client 202, and may include the number of compute instances that may be launched in response to the request. The number of compute instances could be the minimum if the that is all the provider 200 can support, a number below the minimum as an optional choice if capacity will not allow the minimum, the target number, or a number in between the minimum and the target.

Upon receipt of approval to launch a number of instances, the fleet service 210 may then coordinate launching of the compute instances with the fleet service 218 and the request rate manager 220. The request rate manager 220 may send multiple launch requests to the on-demand instance service (s) 224 and/or the spare compute capacity utilization service 212 in batches to better facilitate rapid launching of a large number of compute instances. The request rate manager 220 may coordinate with one or more compute instance managers 222 to select the request rate employed at various points in the responding to the request. Aspects of an example request rate manager, and operations thereof, will be described in greater detail below in reference to FIG. 6.

In some examples, one or more of fleet service 218, spare compute capacity utilization service 212, and data storage service 214 may impose one or more limits to accounts, either categorically or based on characteristics of an account. For example, fleet service 218 may set a limit on instances that may be launched for a given fleet, another limit for instances across multiple fleets for an account, a limit on the number of different specifications for different fleets, or number of fleets per account, and so on. In some aspects, these resource limits may hinder meeting a request with a high minimum instance number. In some aspects, one or more of these limits may be bypassed or disabled, in response to determining that an account is authorized to launch a larger number of compute instances. The fleet service 218 and/or fleet service interface 210 may access the account manager 206 and account data store 208 to determine whether a specific account has such an authorization. In some aspects, the authorization may be unlimited, or may specify a maximum amount of compute instances available to the account.

In yet some examples, fleet service 218 or provider may impose a network limit, such as on a number of VPC's an account may configure, and/or a number of subnets or geographic locations or areas may be utilized in provisioning compute instances. In these examples, these limits may also be bypassed upon determining that an account has one or more relevant authorizations.

In some examples, the spare compute capacity utilization service 212 may impose one or more similar limits, which may be bypassed in a similar way. In some examples, the spare compute capacity utilization service 212 may additionally or alternatively impose a dynamic bid limit, for example based on various account usage history and associated metrics. This limit may also be bypassed upon determining that an account has one or more relevant authorizations.

In some examples, the data storage service 214 may similarly have a per account storage limit. This limit may similarly be bypassed upon determining that an account has one or more relevant authorizations.

In some examples, each of services 218, 212, and 214 may maintain their own account information and track usage. However in other examples, account manager 206, via account data store 208, may maintain and track usage of services 218, 212, and 214. In this scenario, in order to verify that an account has sufficient limits to enable fulfillment of a request, fleet service interface 210 may communicate with the account manager 206 for a complete record of usage and limits associated with an account, and facilitate bypassing those limits when warranted.

In some examples, the fleet service 218, on demand compute instance service(s) 224, and/or spare compute capacity utilization service 212 may impose throttling limits, so as to reduce network overloading, for example upon receiving a high volume of launch requests. As will be described in greater detail in reference to FIG. 6, these throttling limits may be bypassed or worked around by request rate manager 220, via batch requests, to enable rapid launching of a large number of compute instances.

In some aspects, the fleet service 218 may terminate one or more instances by sending a termination request to on-demand compute instance service(s) 224 and/or spare compute capacity utilization service 212. The termination requests may be send at a normal rate or modified by request rate manager 220.

It should be appreciated that request rate manager may additionally or alternatively be a standalone system or subsystem of provider 200, and/or be associated with a different system or service of provider 200, such as compute instance manager 222, spare compute capacity manager 204, and so on.

Figure 3:
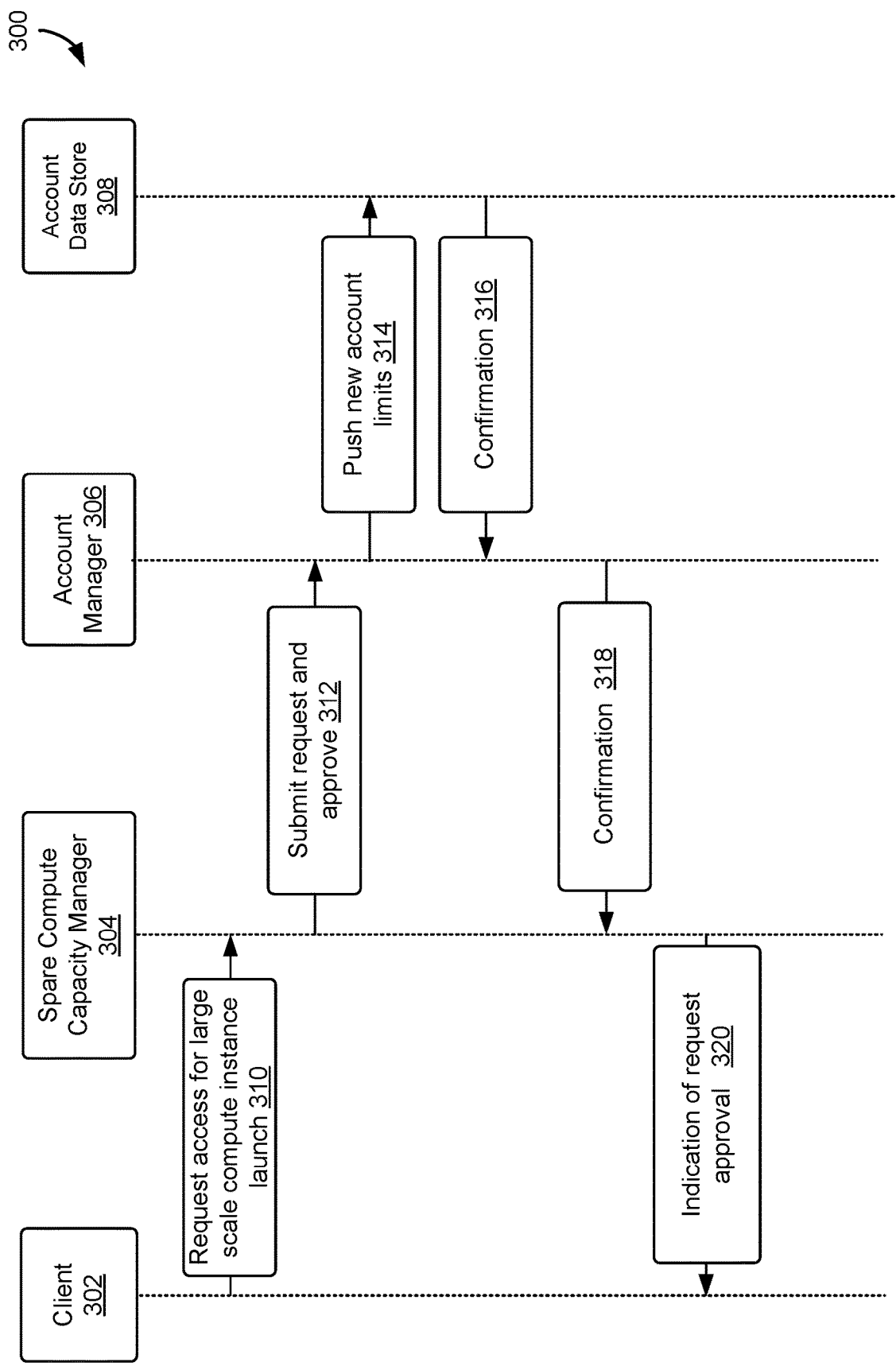
FIG. 3 shows an example of interactions of components of a compute instance provider for authorizing a client for launching a number of compute instances.

FIG. 3 shows an example of interactions 300 of components of a compute instance provider for authorizing a client for launching a number of compute instances. One or more of client 302, spare compute capacity manager 304, account manager 306, and account data store 308 may include one or more aspects of client 202, spare compute capacity manager 204, account manager 306, and account data store 208 described above in reference to FIG. 2.

In some aspects, in order to authorize a higher limit for the number of compute instances a client can launch, the client 302 may either at the time of registering with a provider, such as provider 200, or at any time thereafter, send a request for a higher access limit 310 to the spare compute capacity manager 304.

Upon receiving the request, the spare compute capacity manager 304 may approve and submit the request, at 312, to the account manager 306. In some aspects approval may be granted based on any of a number of different factors associated with client 302 and/or the account of client 302, including usage history with the provider, payment history, and so on. In some aspects, one or more of the functions performed by the spare compute capacity manager 304 may additionally or alternatively be performed by the fleet service interface 210, described above.

The account manager may push the new account limit or limits at 314 to the account data store 306 (e.g., in the form of one or more integer values). In some aspects, a collection or properties may also be stored or associated with the client account in the data store 308, upon approval for increases compute instance limits. The properties may include one or more default settings for an increased limit, such as a default number of instances, and other values or properties. In some cases, an increased limit may be indicate din an account record via a tag or other indicator, which is associated with a default limit or value. The account data store may, in some aspects, confirm proper identification and storage of the increased limits with a specific account, at 316. The account manager 306 may similarly send a confirmation of the account update at 318 to the spare compute capacity manager 304, which may send a similarly confirmation 320 (or denial) to the client 302. In some aspects, the request may be denied by the spare compute capacity manager 304, based on provider resources, bad acts performed by client 302 or associated with the account, or for a number of other reasons.

In some aspects, the process of approving a new client for a higher compute instance limit may be referred to as whitelisting the client. The authorization associated with the account may be accessible to and applicable to any of a number of related services provided by provider, such as services 212, 214, and 218 of provider 200 described above. In some aspects this authorization may take the form of a collection of properties stored in a request type field in the account record in the account data store 308. The request type field may be associated with auto-approval for a standardized or specific compute instance limit increase or number and various provider limit bypasses, as described in greater detail above in reference to FIG. 2. In some aspects, one or more limits or bypasses associated with an account may be revoked, either manually or in response to some trigger event (e.g., some act indicating malfeasance of the client).

Figure 4:
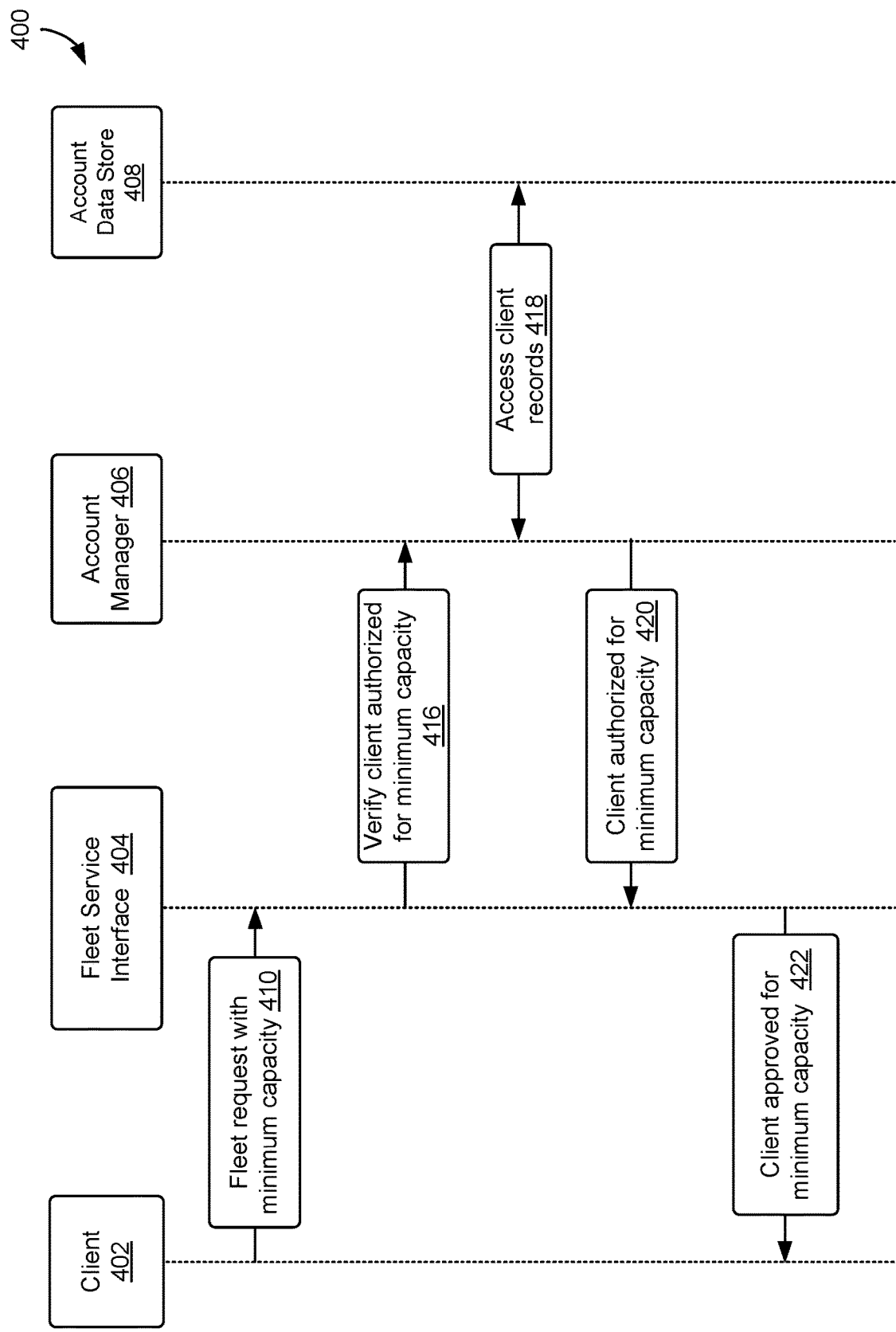
FIG. 4 shows an example of interactions of components of a compute instance provider for verifying that a client is authorized for launching a number of compute instances.

FIG. 4 shows an example of interactions 400 of components of a compute instance provider for verifying that a client is authorized for launching a number of compute instance, for example, that may be performed in response to receiving a launch request specifying a higher number of compute instances to be launched (e.g., above a configurable threshold). One or more of client 402, fleet service interface 404, account manager 406, and account data store 408 may include one or more aspects of client 202, fleet service interface 210, account manager 206, and account data store 208 described above in reference to FIG. 2.

In some aspects, in order to verify that a client 402 is authorized for a higher compute instance request limit, the client 402 may submit a fleet request with at least a minimum number of compute instances required (e.g., minimum capacity) 410 to the fleet service interface 404. In some aspects, the request 410 may include a number of other pieces of information, such as a target number of instanced desired, or other information.

In some examples, the request 410 may be a single API call that includes the parameters to provision a fleet of compute instances (e.g., such as a create fleet API call). In one example, the request may include a minimum number of compute instances to be launched (e.g., an integer value), as well as a target number of instances to be launched (also an integer value), specified by type (e.g., on demand or spare compute capacity). These parameters may also include multiple launch specifications that vary by instance type, availability zone (or other regional, geographic, or location identifier of resources of a compute instance service), or subnet (logical organization of resources within an availability zone). More specifically, the parameters may include one or an array of template configurations (e.g., a string parameter that identifies a launch template) for the fleet. In some aspects, the requests may additionally or alternatively include one or more of a client identifier or token (e.g., a string), that is a unique identifier to track the request and ensure that a request is not fulfilled twice, a parameter (e.g., Boolean) that checks to see if a client or account has the required permissions to launch a fleet, an indication (e.g., string) of whether running instances should be terminated if the total number of instances drops below the requested minimum size or target size of the fleet, an indication of what type of instances can be used to fulfill the request (e.g., spare compute capacity, on-demand, reserved, etc.), as well as an allocation strategy (e.g., a string specifying lowest-price or prioritized), and an indication if different instances types can be sued to fulfill the request, or an indication of whether the request is to be filled instantly, with whatever resources are available and not accounting for any launch errors, whether the request should be fulfilled when resources are available, or whether the number of instances is to be maintained.

The fleet service interface 404 may verify that the client is authorized for at least the minimum number specified in the request via communication 416 with account manager 406. The account manager may then access the client records from account data store 408 at 418, and if the correct authorizations are associated with the account, return an approval message at 420 to fleet service interface 404. In some cases, the fleet service interface 404 may then communicate to the client that there it is authorized for the minimum (or target, as the case may be) number of compute instances at 422.

In some aspects, one or more functions performed by the fleet service interface 404 may additionally or alternatively be performed by the spare compute capacity manager 204 and/or in coordination with other services and components of provider 200 described above.

In some cases, one or more operations of interactions 400 may be performed synchronously, to ensure that a client may also request the number of resources it is authorized to request, to prevent overcommitting of resources.

Figure 5:
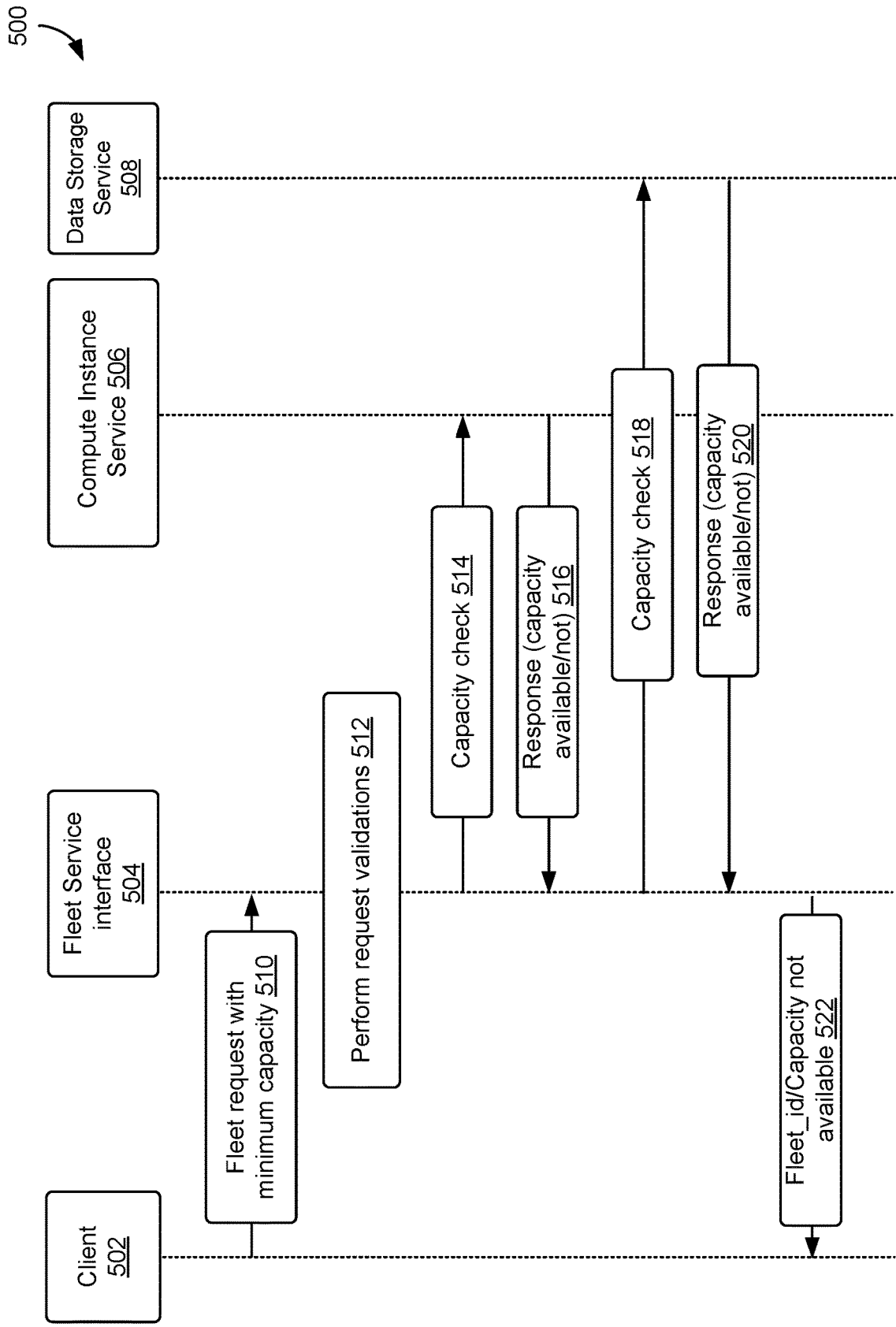
FIG. 5 shows an example of interactions of components of a compute instance provider for verifying that a compute instance service has capacity to fulfill a client request for launching a number of compute instances.

FIG. 5 shows an example of interactions 500 of components of a compute instance provider for verifying that a compute instance service has capacity to fulfill a client request for launching a number of compute instances, for example, that may be performed in response to receiving a launch request specifying a large number of compute instances to be launched (e.g., above a configurable or provider specific threshold). One or more of client 502, fleet service interface 504, compute instance service 506, and data storage service 508, may include one or more aspects of client 202, fleet service 218 or fleet service interface 210, compute instance service(s) 224 and/or spare compute capacity utilization service 212, and data storage service 214, respectively, described above in reference to FIG. 2.

In order to launch a number of instances with a provider, such as provider 200 described above, client 502 may submit a request 510 specifying a minimum number of compute instances to be launch, and in some cases a target or desired number of compute instances to be launched, that is higher than the minimum number. In some aspects, request 510 may include one or more aspects or parameters as request 410 described above in reference to FIG. 4. In some aspects, the request 510 may include a number of other pieces of information, such as a network address space related to the request.

The fleet service interface 504 may, upon receiving the request, validate a number of pieces of information associated with the request 510 and client 502's account, at operation 512. In some cases, validations performed at operation 512 may be triggered by detection of a minimum target number included in request 512. In some aspects, operation 512 may include validating that there is enough network address space across specified subnets to support at least the minimum number of instances requested at operation 512. The fleet service interface 504 may also, at operation 512, validate that the minimum number of instances requested is less than a maximum allowed or supported by the provider. In some cases, if the minimum number is higher than the maximum threshold, the request will be denied. In some aspects, performing request validations 512 may also include verifying that any limits imposed by dependent services of the provider, such as the data storage service 508 and other services, are not exceeded for the account. In some aspects, these amount limits may be modified or determined by one or more authorizations associated with the client account, accessible via account manager 206, as described above.

In some cases, the request validations at operation 512 may be performed synchronously, to ensure that resources are only indicated as available if the provider has capacity, and to prevent overcommitting of resources. In some aspects, the capacity checks at 514 and 518 may be performed for both minimum number and a target number of compute instances.

Upon successfully validating of the request, including a sufficient network address space, and other service limits, the fleet service interface 504 may check available capacity with the compute instance service 506 at 514 and with the data storage service 508 at 518. In some cases, checking capacity with the compute instance service 506 may include checking capacity of one or both of an on-demand compute instance servicer, such as service(s) 224 and a spare compute capacity utilization service, such as service 212, dependent on any of a variety of factors. These factors may include size of the request (larger request may necessitate looking to both services, whereas smaller requests may only necessitate looking at one of the services), availability of either service, etc. Both the compute instance service 506 and the data storage service 508 may respond by indicating whether the capacity is available, at 516 and 520. The fleet service interface 504 may then return an indication of whether there is capacity for the request to the client 502 as message 522. In some cases, message 522 may include a fleet identifier or other identifier if the request is approved, for example, to enable the client 502 to access and operate the compute instances, once launched, or enable configuration of other parameters of the compute instances. In some aspects, the message 522 may indicate a number of instances available, for example, specifying the minimum, the target, or another number, as the case may warrant.

In some cases, the capacity checks 514 and 518 may first be performed for the minimum number of compute instances requested (e.g., a first number). If that number is available, that may be indicated to client at message 522. In some cases, if the minimum is available, the fleet service interface 504 may also check capacity for the target number of instances indicated in the request, sending additional capacity checks 514 and 518 to the compute instance service 506 and data storage service 508, and indicate the result to client 502. In some aspects, when the minimum number is available, that number of instances may be automatically launched, without requiring additional client input. In yet some aspects, when the target number is available, or any number in between the minimum and the target, that number of instances may be automatically launched, without requiring additional client input.

In some cases, the client request 510, and similarly client request 410 described above, may indicate a number of compute instances to fulfil the request. In some cases, the request may indicate both a first number and a target number which is larger than the first number (e.g., a minimum number). In any of these scenarios, the request can indicate an explicit number of compute instances, or implicitly indicate a number of compute instances. In some cases, the request may include information used to determine a number of instances to fulfill the request. For example, a request may specify that 1 million cores or instances are needed, whereby fulfilling the request may be satisfied with a lesser number of multi-core instances to get to the 1 million cores requested. It should be appreciated that a variety of metrics, parameters, and the like may be used to specify how many, type, and configuration, of different compute instances are requested for purpose of this disclosure.

In some cases, the number of compute instances that gets launched may be the maximum amount supported by both the compute instance service 506 and the data storage service 508. For example, the compute instance service 506 can support 1,000,000 instances, but the data storage service 508 can only provision 900,000 storage volumes, the fleet service interface 504 may launch 900,000 instances, for example assuming that 900,000 instances meets or exceeds the minimum number specified in the request 510.

Figure 6:
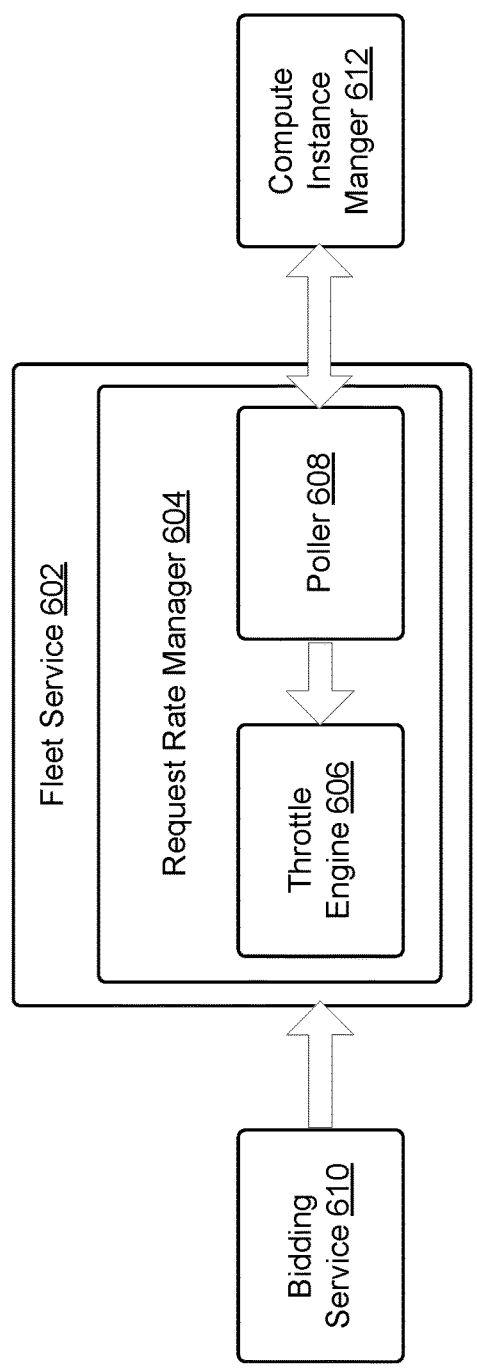
FIG. 6 shows an example of components of a fleet service of a compute instance provider

FIG. 6 shows an example 600 of a request rate manager 604 interacting with other components of a compute instance provider, such as provider 200 described above in reference to FIG. 2. In the example illustrated, request rate manager 604 may be part of a fleet service 602, such as fleet service 218, and may communicate with one or more compute instance managers 612, such as compute instance manager 222, described above in reference to FIG. 2. The request rate manager 604 may include a throttling engine 606 and a poller 608.

The call rate that the fleet service 602 or provider can support may vary based on the current load on the service 602 or dependent services. In order to make loading information or request call rate information available to the service 602, the request rate manger 604 may obtain request rate information from one or more compute instance managers 612. In some examples, the request rate manger 604 may host an API, such as poller 608, that will return or obtain the safe allowed call rate for example, currently available or for a given time period in the future, such as once per minute for the following minute. In some aspects, the poller 608 may call an API to obtain the available call rate information, which may be returned in one or more integer values, for example. In other aspects, rate information or other load information may be provided or obtained at other intervals, periodically or aperiodically, or based upon the occurrence of some trigger event. The poller 608 may communicate the rate information to the throttle engine 606. The throttle engine 606 may then regulate the rate at which launch requests are sent to one or more compute instance services, such as service(s) 224 described above in reference to FIG. 2. In some aspects, the throttle engine 606 may make a determination of the rate at which launch requests may be sent to a compute instance service in response to receiving a request for a large number of compute instances received or communicated by the fleet service 602.

In some aspect, the poller 606 may be configured to obtain rate information from compute instance manager 612 asynchronously, at any of a variety of different time intervals. In some aspects, the poller 606 may run from a single host machine. In some examples, the poller 608 may convert the rate information into a number of tokens, representing an allocation of additional capacity for requests for compute instances (or available compute instances themselves) that may be supported by the compute instance service. The poller 606 may send the token information, including a number of available tokens at any point in time, to the throttle engine 606. When the request rate manager 604 receives a request to launch a large number of compute instances (e.g., above a configurable threshold), it may consult throttle engine 606 to determine at what rate launch requests may be sent to a compute instance service, based on the number of available tokens. In this way, launch requests sent to the compute instance may be allocated base d on available resources, via a token tracking-type system. If there are not enough tokens for a given request, the throttle engine 606 may indicate that the current rate limit does not support the request. The request rate manager 604 and/or fleet service 602 may then relay that information to a client, in the case that the request cannot be fulfilled.

In some aspects, the request rate manager 604 may send multiple launch requests in parallel to a compute instance service. In some aspects, sending multiple batches in parallel may bypass the throttle or rate limits imposed by fleet service 602 or the provider more generally. In some aspects, each batch request may be sent at a rate below a rate limit otherwise imposed by the provider. In yet some aspects, the provider may verify that the client has authorization to override or bypass the rate limits, to enable more efficient launching of a higher requested compute instance number. In some cases, the request rate manager 604 may determine various parameters for sending launch requests in parallel based on the number of tokens available, as maintained by the throttle engine 606. These parameters may include the number of separate parallel group requests to launch, how many requests in each group, a rate at which to send requests, a delay in between requests, and so on. In some cases, the request rate manager 604 may also utilize the number of compute instances requested to inform setting these or other parameters. The request rate manager 604 may set these parameters to at least one of optimize a time to send all the launch requests, manage traffic to the compute instance service so as not to overload the service and cause further delays, minimize the number of separate requests sent to fulfill the client request, and so on.

In some aspects, the request rate manager 604 may obtain end to end launch times for compute instances, for example, from the time a client request is received until the time one or more compute instances are launched. The rate quest rate manager 604 may track this information to determine one or more baselines. For example, the request rate manager 604 may obtain one or more launch times (e.g., end to end launch times) when the provider 200 is under different loads, handling different request volumes, at different points in time, etc. From these metrics, the request rate manager 604 may determine one or more average or baseline end to end launch times when the provider is operating under different conditions. These baselines may then be compared to obtained launch times during operation, and used to determine if the provider 200, on-demand compute instance service 224, compute instance manager 222, or spare compute capacity utilization service 212, for example, are under duress, to enable changing the call rate to prevent or reduce the likelihood of an overload condition. In some cases, the request rate manager 604, in addition to or alternatively from using baselines, may track real-time or near real time end to end launch times for requests. As the launch time increases, it may decrease the call rate, so as to maintain quality of service. In some cases, the request rate manager 604 may selectively throttle certain requests (or outright reject them), when the launch time goes above a threshold. In some aspects, this may include first throttling high volume requests (e.g., requests for above a threshold number of compute instances), and then progressively moving to lower volume requests until the provider 200 returns to a normal operating state (e.g., the launch time hits or goes below a second threshold).

In yet some examples, the request rate manager may monitor the provider 200 and/or one or more services thereof, to detect an anomaly or characteristics that deviates from a normal operation condition. The anomaly may include a longer end to end launch time, delayed responses, and other conditions, based on which the request manager 604 may determine to decrease the call ate for one or more requests, to help return the provider 200 or service to a normal operating condition.

In some aspects, the fleet service 602 and/or request rate manager 604 may receive more than one bid or request for launching compute instances at any given time, or in close proximity to one another (e.g., contemporaneously). In these circumstances and others, such as when a second request is received before a first request has been resolved (e.g., resources set aside to fulfill the first request), it may be important to account for the first request or delay, in order to prevent the system from overcommitting resources. To address these situations, a bidding service 610 may obtain token information from the throttling service, and prioritize or otherwise process or delay requests to ensure that the compute instance service is not overloaded or overcommitted. In some aspects, the bidding service 610 may reserve some rate capacity or compute instance capacity to ensure that the fleet service 602 and/or the compute instance service is not overcommitted. In some cases this may include adjusting the obtained launch rate request information to account for a first number of compute instances requested in a first request. This may include reserving a number of tokens, not otherwise consumed or used, for example when multiple client requests are received. In some aspects, the number of tokens reserved may be based on the actual number of compute instances requested in the first request. In other aspects, the bidding service 610 may hold for a certain period of time (e.g., a couple of seconds), before submitting the request or communicating the request to the fleet service 602/request rate manager 604, or before verifying that there is sufficient capacity to launch the number of instances contained in a second request, to help ensure that system resources are not overcommitted. In some aspects, the biding service 610 may delay a certain period of time before submitting the request to the request rate manager 604 or delay before making a determination as to whether the second request can be fulfilled, in order to receive updated rate information from the poller 608 to account for resources that may be committed in order to fulfill the first request.

In some aspects, the request rate manager 604 and/or the throttle engine 606 may implement different throttling limits for different accounts and/or different client requests, for example, based on volume of the request, priority value associated with the account of the request, and so on.

In some aspects, the fleet service 602 and/or the request rate manager 604 may receive health status updates, system metrics information, and other information ancillary service information (e.g., tagging information) from the compute instance service manager 612. These may be sent at regular intervals or irregular intervals, and may report on the status, metrics, and other information of one or more components of a managed compute instance service. In some cases, this reporting may slow down the compute instance manager 612, especially when it is handling a large number of compute instance request launches and/or managing a large number of compute instances. In these scenarios, it may be beneficial for the fleet service 602 and/or request rate manger 604 to throttle or otherwise adjust or reduce a rate at which the health status updates are generated and reported, for example, to free up resources to deliver better performance, particularly with high volume requests.

In some examples, the rate at which compute instances are requested may be increased for large scale fleet deployments only, such that if a request meets or exceeds a threshold number of compute instances or other quantity related to the size of the launch request, the request rate may be increased and/or the requests may be sent in parallel batches. In other examples, the request rate for all requests for compute instances may be increased, either by increasing the request rate and/or sending the requests in parallel batches. In other examples, the request rate may be increased for small scale fleet requests (e.g., below a threshold number of compute instances), when the provider as a whole is either below, or above a utilization threshold of other indication of load on the provider.

Figure 7:
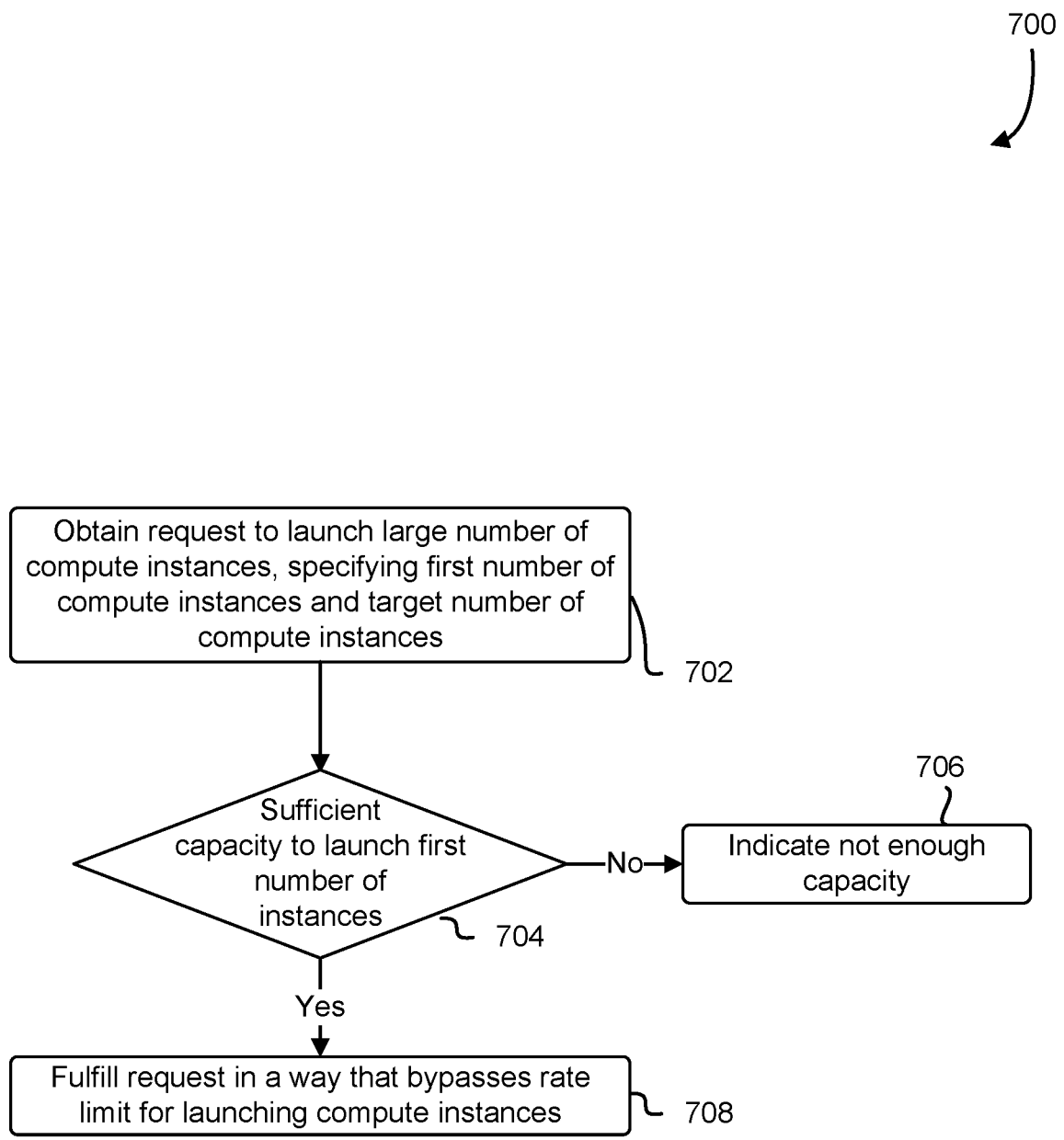
FIG. 7 shows an illustrative example of a process for verifying capacity for fulfilling a request to launch a number of compute instances.

FIG. 7 shows an illustrative example of a process 700 for verifying capacity for fulfilling a request to launch a number of compute instances. In some aspects, process 700 may be performed by one or more components of a compute instance provider, such as fleet service interface 210, spare compute capacity manager 204, account manager 206, fleet service 218, request rate manager 220 and other services and components of provider 200 described above in reference to FIG. 2 and/or FIG. 6.

In one example, a compute instance provider may obtain a request to launch a large number of compute instances at operation 702. The request may specify a first number of compute instances and a target number of compute instances, with the target number being greater than the first number. In some aspects, the first number may specify a minimum number of compute instances that are acceptable to a client for accepting services of the provider. The request may specify or include actual numbers of compute instances, cores, etc., or may specify other parameters than can be used to determine a number of compute instances to meet the specified parameters, such as processing requirements, memory requirements, and the like. Obtaining the request may include receiving the request through one or more web interfaces, receiving it from a fleet service interface, such as interface 210 described above, or may include accessing the request from a temporary or persistent storage location, such as fleet data store 216 described above in reference to FIG. 2.

Next, the compute instance provider may determine if there is sufficient capacity to launch the first number (e.g., minimum) of requested compute instances, at operation 704. Operation 704 may include checking with one or more dependent services to see if they have sufficient capacity, such as one or more data store services. If there is not sufficient capacity, the provider may indicate to the client that there is not enough capacity to fulfill the request, at operation 706. If the provider does have capacity, it may automatically fulfil the request in a way that bypasses any rate limits for launching compute instances that may be imposed by one or more aspects of components of the provider, at operation 708. In some cases, the rate limit may include one or more of a resource limit or a throttling limit, as described in greater detail above. In some cases, fulfilling the request at operation 708 may include verifying that the request or an account associated with the request is authorized to exceed the one or more rate limits. This may be accomplished by verifying with an account manager if the account has been pre-authorized for a larger number of compute instances, either via a code or flag, or by checking specific limits associated with the account.

In some aspects, if the provider determines that it has sufficient capacity at operation 704, it may verify if it has capacity for the target number of compute instances as well. In the event the target number of instances can be launched with available provider resources, the provider may then launch the target number of instances at operation 708. If a number in between the target number is determined to be available, that number of instances may be launched at operation 708.

In some aspects, operation 704 may include determining if the provider has capacity for a duration of time to meet one or both of the minimum or target number of instances. The duration may be configurable, and may help ensure that resources of the prover are not over committed in the scenario that multiple requests are received in a short period of time.

In other examples, operation 708 may include launching the maximum number of available compute instances to fulfill the request, unless capacity is otherwise limited or constrained. The maximum number may be set by the target capacity indicated in the request a maximum allowed number of compute instances associated with the account of the request, or maximum available compute instances the provider has available, or other number. In some cases, the maximum number of available compute instances may be bound by the minimum and./or maximum number of compute instances indicated in the request, such as at least the minimum number, and, in some cases, no larger than the target number.

Figure 8:
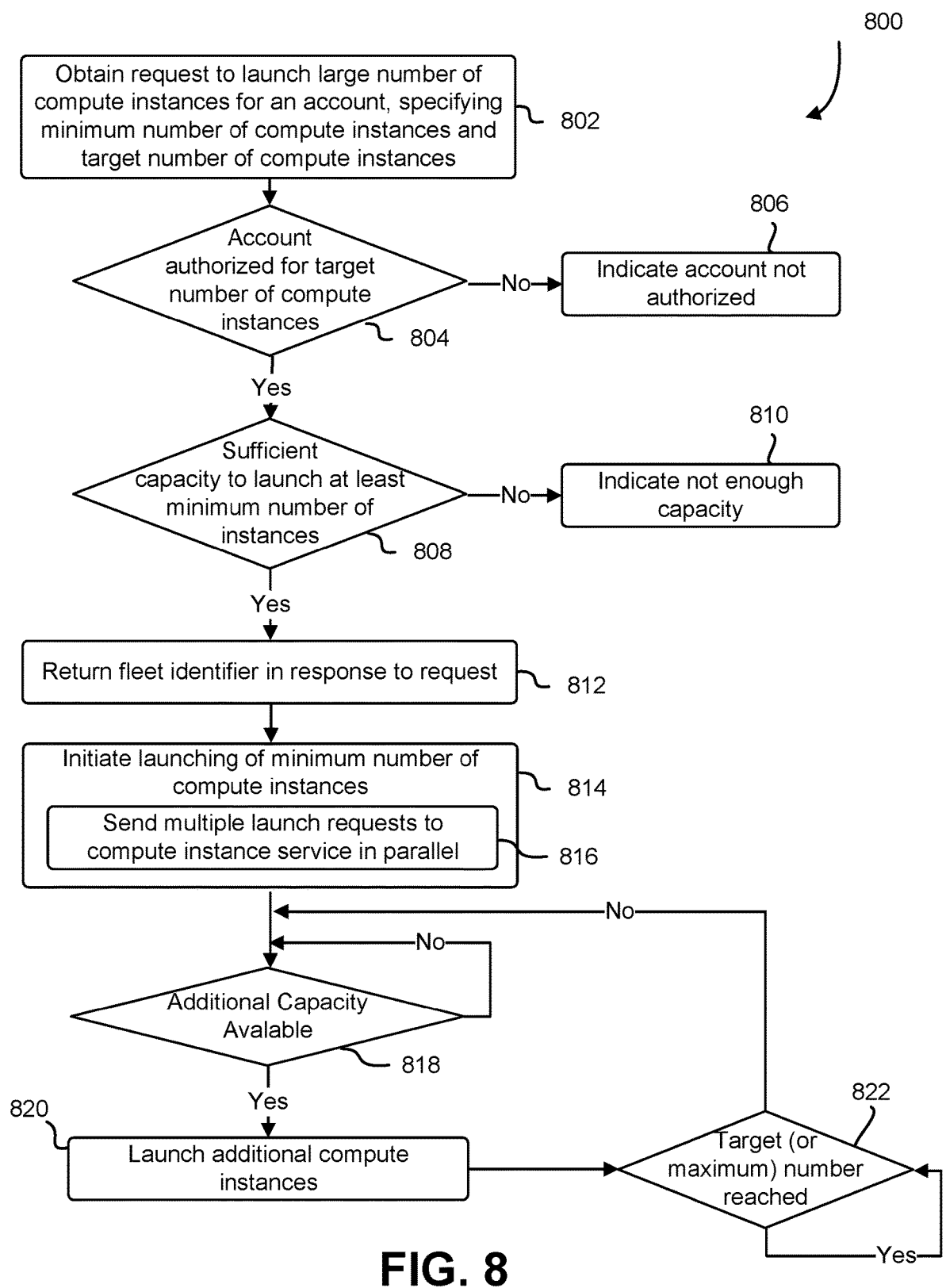
FIG. 8 shows another illustrative example of a process for verifying capacity for fulfilling a request to launch a number of compute instances.

FIG. 8 shows another illustrative example of a process 800 for verifying capacity for fulfilling a request to launch a number of compute instances. In some aspects, process 800 may be performed by one or more components of a compute instance provider, such as fleet service interface 210, spare compute capacity manager 204, account manager 206, fleet service 218, request rate manager 220 and other services and components of provider 200 described above in reference to FIG. 2 and/or FIG. 6.

A compute instance provider may obtain a request to launch a large number of compute instances for an account at operation 802. The request may specify a minimum number of compute instances and a target number of compute instances. In some cases, the request may specify a minimum number of compute instances to ensure that the fleet of compute instances will meet one or more requirements for proper operation of the fleet. For example, in some cases a consensus protocol running on the fleet may require a minimum number of nodes, such that the fleet cannot properly operate with less than a minimum number of compute instances. It should be appreciated that this reason for specifying a minimum number of compute instance si only given by way of example, and that other various reasons are contemplated herein.

Next, at operation 804, the provider may verify that the account is authorized for the target number of compute instances requested. This may include verifying with an account manager, if the account has be pre-authorized for the target number, as described in more detail above. If the account is not authorized for the target number, the provider may then check to see if the account is authorized for the minimum number specified in the request. If the account is not authorized for at least the minimum number, then the provider may generate and send an indication 806 that the account is not authorized, for example, to the client. If the client is authorized, the provider may then determine or check if there is sufficient capacity to launch the minimum number of instances, at operation 808. In some cases, operation 808 may include checking if there is enough capacity to launch the maximum number the client is authorized to launch (e.g., the target number if authorized, and the minimum number if the target is not authorized, but the minimum is). Operation 808 may include one or more aspects of operation 704 described above, and so will not be repeated again here. In the event there is not enough capacity, the provider may generate and send an indication 810 that the provider does not have enough capacity, for example, to the client.

In other cases, operation 804 may include first checking to see if he client is authorized for the minimum number, and then checking to see if authorized for the target number. In some cases, if the minimum number is authorized, the provider may check to see if there is sufficient capacity for the minimum number. If so, then operations 804 and 808 may be performed again for the target number, and the highest number chosen for launching.

If both operations 804 and 808 yield positive results, process 800 may continue to operation 812, where the provider may return a fleet identifier or other identifier or message in response to the request, such as to the client. The fleet identifier or other identifier may enable a client to configure, access, and/or utilize the fleet, for example, once the fleet has been launched. In some examples, operations 804 and 808 may be repeated, if the minimum number of instances is authorized and available, for the target number. The provider may then select the higher number to launch.

The provider may, at operation 814, initiate launching (e.g., start a workload) of the minimum (or target, if available and authorized) number of compute instances. In some cases, operation 814 may include sending multiple launch requests to a compute instance service in parallel, at operation 816. One or more of operations 814 and 816 may be modified by or carried out at least in part by a request rate manage, such as request rate manager 220 or 604 as described above in reference to FIGS. 2 and 6.

In some cases, process 800 may also include operations 818, 820, and 822. At operation 818, the provider may determine if there is additional capacity to launch additional compute instances to fulfill the request. If yes, then the available additional compute instances may be launched, at operation 820. In some aspects, operation 820 may include launching all of the compute instances determined to be available, until the maximum authorized number of compute instances for the account associated with the account are reached, or until the target number of compute instances indicated in the request is reached, as determined at operation 822. Once the target or maximum number of compute instances has been reached, process 800 may continue to loop through operation 822, to detect if any compute instances are taken offline. In that situation, once the number of compute instances drops below the target or maximum number, as determined at operation 822, process 800 may loop back to operation 818, and continue to loop through operations 818, 820, and 822 until the request is fulfilled.

In some aspects, if additional capacity is not available, as determined at operation 818, the provider may continue to check for, and add, additional compute instances by looping through operations 818, 820, and 822. In some examples, once a target or maximum number of compute instances is reached at operation 822, process 800 may end.

Operation 818 may performed periodically, a periodically, or upon the occurrence of a trigger condition, which may include one or more services of the provider indicating that it has available capacity.

In some cases, the request may specify whether launching additional compute instances is enabled, for example, via a parameter in an API call. In this case, if the request indicates that a minimum number of compute instances is sufficient, but requests a target number, then the provider may infer or assume that adding additional compute resources when they become available, is enabled, such that operations 818, 820, and 822 may performed once or multiple times until the target number is reached. In other cases, the request may specify a number of times or a time window in which operation 818, 820, and 8922 are to be performed. In yet other cases, the request may specify simply if this feature is enabled or disabled.

In other cases, the request may specify a time period in which the request may be fulfilled. In this scenario, the provider may predict, based on historical data of capacity (e.g., correlating to time of day the request is received relative to available capacity, number of requests currently pending relative to available capacity, and so on), when at least the minimum number of compute instances will be available. If the predicted time is within the client specified window, the provider may indicate that it can fulfil the request. In some cases, if capacity is not available, the provider may predict if, at a certain point in time in the future, it will have enough capacity. The provider may then communicate the predicted time at which the provider will have capacity to the client, to enable the client to decide whether to submit the request for fulfillment.

In some cases, the provider 200 may have multiple requests pending that have not reached a maximum number of compute instances. In this scenario, the provider may prioritize which request additional capacity is used to service, such as based on account information associated with the requests, priority values associated with those accounts, or based on some other scheme, such as round robin.

Figure 9:
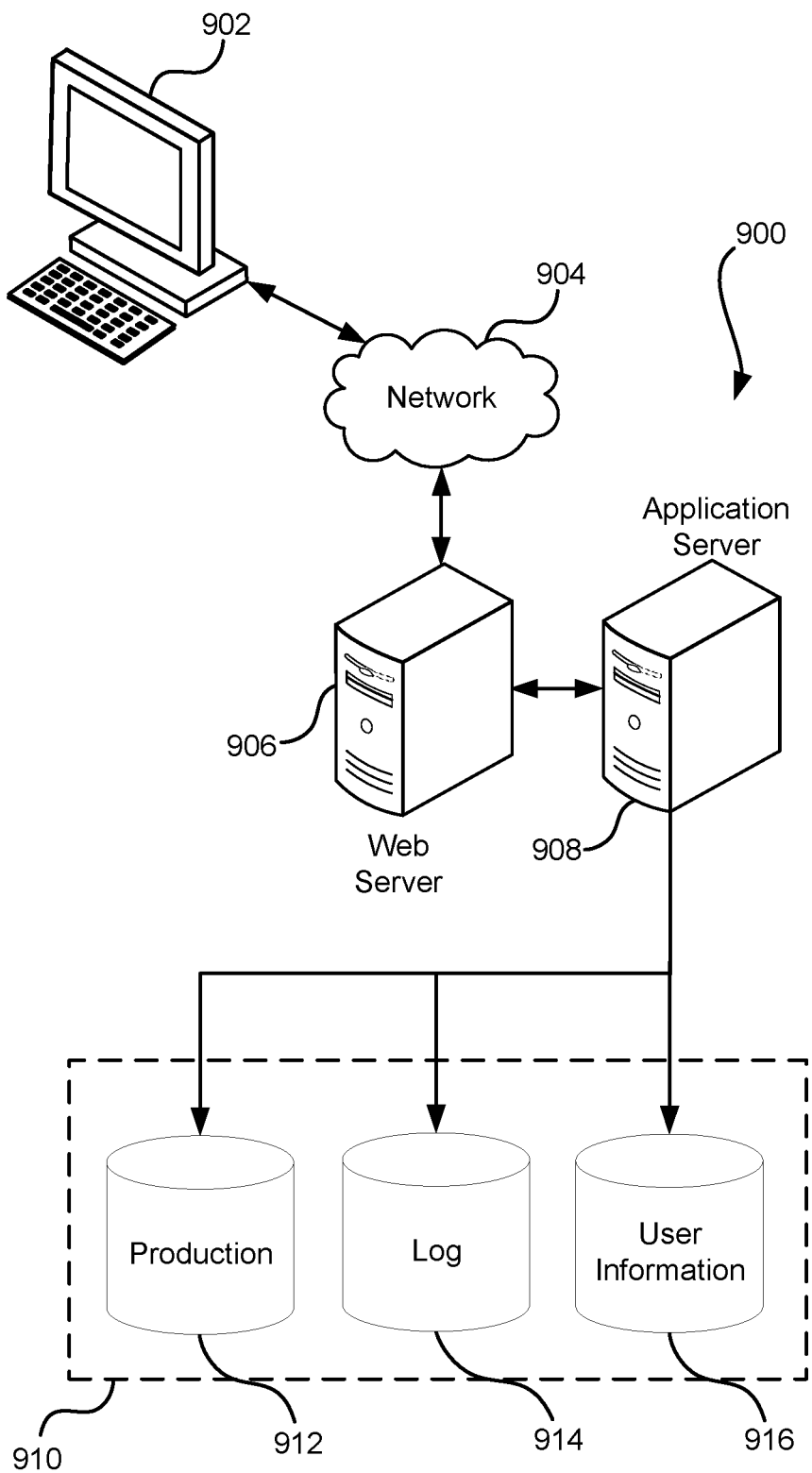
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory with instructions that, as a result of being executed by the one or more processors, cause the system to at least:
   obtain an application programming interface request to launch a plurality of compute instances, wherein the request indicates a minimum number of compute instances and a target number of compute instances; and
   process the application programming interface request by at least:
   verifying that an account associated with the request is authorized for at least the minimum number of compute instances;
   determining that a compute instance service has sufficient capacity to launch a number of compute instances that is at least the minimum number of compute instances;
   returning a fleet identifier in response to the application programming interface request; and
   initiating a workflow to cause the compute instance service to launch at least the minimum number of compute instances and additional compute instances as they become available over time up to the target number, the workflow comprising transmitting multiple launch requests in parallel to the compute instance service.

2. The system of claim 1, wherein the request indicates a time window for launching at least the minimum number of compute instances, and wherein the instructions that cause the system to determine that the compute instance service has sufficient capacity to launch at least the minimum number of compute instances further include instructions that, as a result of being executed by the one or more processors, cause the system to at least:
   predict that the compute instance service will have sufficient capacity to launch the number of compute instances that is at least the minimum number of compute instances within the time window.

3. The system of claim 1, wherein the instructions that cause the system to determine that the compute instance service has sufficient capacity to launch at least the minimum number of compute instances further include instructions that, as a result of being executed by the one or more processors, cause the system to at least:
obtain available launch request rate information;
convert the obtained available launch request rate information into a number of tokens; and
determine if the compute instance service has sufficient capacity to launch at least the minimum number of compute instances based on comparing the minimum number of compute instances and the number of tokens.

4. The system of claim 1, wherein the memory further includes instructions that, as a result of being executed by the one or more processors, cause the system to:
obtain available launch request rate information and historical launch rate request information; and
throttle a rate of sending the multiple launch requests to the compute instance provider based on the obtained available launch request rate information and the historical launch rate request information.

5. A method, comprising:
obtaining a request associated with an account to launch a plurality of computing instances, wherein the request indicates a first number of compute instances and a target number of compute instances that is larger than the first number;
verifying sufficient capacity to launch at least the first number of compute instances; and
fulfilling the request by at least launching at least the first number of compute instances and additional compute instances as they become available over time up to the target number, wherein fulfilling the request further comprises bypassing at least one account limit that limits a rate at which compute instances can be launched.

6. The method of claim 5, wherein fulfilling the request by at least launching at least the first number of compute instances and additional compute instances as they become available over time up to the target number in a way that bypasses the at least one account limit that limits a rate at which compute instances can be launched further comprises associating an account limit override with a record of the account, and verifying, upon obtaining the request, that the record of the account contains the account limit override.

7. The method of claim 6, wherein the at least one account limit comprises a first number of compute instances that can be launched, and wherein the account limit override comprises a second number of compute instances that is larger than the first number.

8. The method of claim 5, wherein verifying sufficient capacity to launch at least the first number of compute instances further comprises verifying that a compute instance service has sufficient capacity to launch at least the first number of compute instances for a duration of time.

9. The method of claim 5, further comprising:
obtaining historic launch time information; and
determining a maximum rate at which compute instances can be launched based on the obtained historic launch time information.

10. The method of claim 5, wherein verifying sufficient capacity to launch at least the first number of compute instances further comprises verifying that one or more dependent services have capacity to support launching at least the first number of compute instances.

11. The method of claim 5, further comprising:
obtaining a second request to launch a second plurality of computing instances prior to determining to fulfill the request to launch a plurality of compute instances, wherein the second request indicates a second number of compute instances and a second target number of compute instances that is larger than the second number; and
waiting for a period of time before verifying sufficient capacity to launch at least the second number of compute instances.

12. The method of claim 5, further comprising:
obtaining a second request to launch a second plurality of computing instances prior to determining to fulfill the request to launch a plurality of compute instances, wherein the second request indicates a second number of compute instances and a second target number of compute instances that is larger than the second number; and
obtaining available launch request rate information;
adjusting the available launch request rate information to account for launching the first number of compute instances; and
verifying, sufficient capacity to launch at least the second number of compute instances based on the second number of compute instances and the adjusted available launch request rate information.

13. A non-transitory computer-readable storage medium having stored thereon executable instructions that, as a result of being executed by one or more processors of a computer system, cause the computer system to at least:
obtain a request to launch a plurality of compute instances, wherein the request indicates a first number of compute instances and a target number of compute instances that is larger than the first number;
validate fulfillability of the request based on at least the first number of compute instances and capacity of a compute instance service; and
send batches of parallel requests to launch a maximum number of compute instances based on the capacity of the compute instance service and additional compute instances as they become available over time up to the target number, wherein the maximum number of compute instances is at least equal to the first number of compute instances.

14. The non-transitory computer-readable storage medium of claim 13, wherein the instructions further cause the computer system to:
obtain available launch request rate information; and
throttle a rate of sending the batches of parallel requests to launch at least the number of compute instances based on the obtained available launch request rate information.

15. The non-transitory computer-readable storage medium of claim 13, wherein the instructions further cause the computer system to:
obtain available launch request rate information; and
determine at least one of a number of requests to include in at least one of the batches or a number of the batches based at least in part on the obtained available launch request rate information.

16. The non-transitory computer-readable storage medium of claim 13, wherein the instructions further cause the computer system to:
obtain historical launch rate request information; and throttle a rate of sending the batches of parallel requests based on the historical launch rate request information.

17. The non-transitory computer-readable storage medium of claim 13, wherein the instructions further cause the computer system to adjust a health status check rate on the computing system provider based on a granted request to launch the plurality of computing instances.

18. The non-transitory computer-readable storage medium of claim 13, wherein the instructions further cause the computer system to verify that a large enough network address space is available to support at least the first number of compute instances sufficient for fulfillment of the request.

19. The non-transitory computer-readable storage medium of claim 13, wherein the instructions further cause the computer system to verify that the request is authorized for launching at least the first number of compute instances sufficient for fulfillment of the request.

20. The non-transitory computer-readable storage medium of claim 19, wherein the instructions for verifying that the request is authorized for launching at least the first number of compute instances sufficient for fulfillment of the request further comprise instructions for verifying that an account associated with the request has not exceeded a total compute instance limit of the compute instance service.

\* \* \* \* \*